(12) United States Patent
Sasaki

(10) Patent No.: US 6,480,676 B2
(45) Date of Patent: Nov. 12, 2002

(54) FILM PRESSING DEVICE FOR INSTANT PHOTOGRAPHIC TYPE IMAGE RECORDING APPARATUS

(75) Inventor: Hidemi Sasaki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/906,113

(22) Filed: Jul. 17, 2001

(65) Prior Publication Data

US 2002/0012532 A1 Jan. 31, 2002

(30) Foreign Application Priority Data

Jul. 27, 2000 (JP) ........................................ 2000-226694

(51) Int. Cl.⁷ ............................................... G03B 17/50
(52) U.S. Cl. .............................. 396/30; 396/32; 396/35; 396/440; 396/442
(58) Field of Search .............................. 396/30, 32, 35, 396/440, 442, 443

(56) References Cited

FOREIGN PATENT DOCUMENTS

| JP | 10-39405 | 2/1998 | ........... G03B/17/52 |
| JP | 2000-10183 | 1/2000 | ........... G03B/17/52 |

*Primary Examiner*—D. Rutledge
(74) *Attorney, Agent, or Firm*—Sughrue Mion, PLLC

(57) ABSTRACT

The printer built-in electric still camera has a pack chamber for loading a film pack, and a pack chamber door for opening and closing the pack chamber. On an inner face of the pack chamber door, plural film pressing devices are attached. When the pack chamber door is closed, the film pressing devices enter in a pack case from access openings formed on the pack case. The film pressing device has a frame and two pressure levers. The frame has a channel-shaped form and its bottom face is fixed on the pack chamber door. First and second shafts are attached to side plates of the frame, and ends of first and second pressure levers are rotatably fitted on the shafts. The first and second pressure levers are rotated by the bias of a strong spring and a weak spring. Other ends of the levers press the film unit.

18 Claims, 9 Drawing Sheets

FILM PRESSING DEVICE FOR INSTANT PHOTOGRAPHIC TYPE IMAGE RECORDING APPARATUS

BACKGROUND OF THE INVENTION

1. Field of the Invention

The present invention relates to a film pressing device applied to an instant photographic type image recording apparatus and, more particularly, to a film pressing device for pressing an instant film unit to an exposure station.

2. Description Related to the Prior Art

An instant photographic type image recording apparatus (hereinafter simply called an image recording apparatus) is known and used to record an image on an instant film unit as a recording medium. As the image recording apparatus, an instant printer and an instant camera are on the market, and a printer built-in electric still camera is also produced.

In the image recording apparatus, a film pack is loaded. The film pack includes a pack case and at most ten instant film units of mono sheet type (hereinafter simply called film units) which are piled up in the pack case. The image recording apparatus includes an exposure head which scans over an exposure surface of the film unit in the pack case to expose it to red, green and blue lights one by one. The film unit has a pod containing processing solution in a leading edge of the exposure surface. The exposed film unit is ejected from an ejection port of the image recording apparatus. While the film unit is squeezed through the film processing rollers, the pod is ruptured and the processing solution spreads over the film unit so that development may be made.

The image recording apparatus in the prior art has a pack chamber wherein the film pack is loaded, and a pack chamber door rotatably attached on its back side. On the inner face of the pack chamber door, the film pressing devices are attached. The film pressing device, when the pack chamber door is closed, enters into the film pack from an access opening formed on a face opposed to the exposure opening, and presses the film unit on the exposure opening. Thus, the top one of the film units keeps its exposure face flat on the exposure opening.

The film pressing device described above is disclosed for example in Japanease Patent laid-open publication number H10-39405, and includes a pressing member for contacting a film unit, a spring for biasing the pressing member to protrude in a direction perpendicular to the inner face of the pack chamber door, and a holder which holds them and is fixed on the inner face. The pressing member enters in the pack case from an access opening on its rear face and presses the film units to an exposure opening.

When the film pack contains the ten film units, the pressing member is positioned in a first contact position wherein the pressing member contacts the tenth film unit. While it is repeated to take a picture, the number of the film units remaining in the film pack is decreased. Accordingly, the pressing member shifts from the first contact to a second contact position wherein the film pack contains only the one film unit. The film pressing device, as it protrudes out perpendicular to the pack chamber door, must be longer along the protruding direction than at least the length of displacement; namely, a distance between the first and second contact positions. Further, the pressing member and the spring are arranged along the protruding direction in the holder. It is necessary to keep a space which contains the spring in pressed condition. Therefore, a gap is formed between the film pack and the pack chamber door, which increases thickness of the image recording apparatus.

A film pressing device disclosed in Japanese Patent laid-publication number 2000-10183 includes a first slide member for contacting the film unit, a spring for biasing the first slide member in a protruding direction, a second slide member which slidably secures the first slide member and protrudes in the protruding direction in accordance with the slide of the first slide member, and a holder which is fixed on an inner face of the pack chamber door disposed in the backside of the image recording apparatus and slidably secures the second slide member. In this construction, the length of each slide member along the protruding direction is about half of the displacement, and thus, becomes shorter.

However, in the film pressing device disclosed in the publication number 2000-10183, the spring and the first and second slide members are arranged in a line along the protruding direction. Therefore, a part of the holder cannot be inserted in the pack case and thus it is necessary to keep a space for it between the film pack and the pack chamber. However, as the image recording apparatus, for example the instant camera and the printer built-in electric still camera, is usually carried, it would be preferable to be slimmer.

SUMMARY OF THE INVENTION

In view of the foregoing, an object of the present invention is to provide a slimmer image recording apparatus.

Another object of the present invention is to provide an image recording apparatus in which pressure of a pressing member onto a film unit is adjusted in accordance with number of the film unit in a pack case.

The above objects and other objects are achieved by providing a pressing member rotatable between a first rotational position and a second rotational position. The pressing member is rotatably attached to a holder fixed on an inner face of a pack chamber door. When the pack chamber door is closed, the pressing member is inserted into the pack case from an access opening. While the pressing member rotates to the second rotational position, a pressing portion thereof presses a rear face of the film unit which is the lowest in the pack case.

In the preferred embodiment of the present invention, a biasing member has a first torsion spring whose force is weak, and a second torsion spring whose force is strong. The first torsion spring biases the pressing member from the first rotational position to a third rotational position, and the second torsion spring biases the pressing member from the first rotational position to the second rotational position. The third rotational position is between the first rotational position and a second rotational position.

In the more preferred embodiment of the invention, plural of the film pressing devices are attached on the pack chamber door, and presses the film unit. The film pressing device has two pressure levers whose rotational directions are opposite to each other.

In other embodiments, the film pressing device is provided with rotatable first and second pressure levers. The middle portions of the first and second pressure levers are connected by a pin fitting in a long hole. Ends of the first and second pressure levers are connected with a pressure plate. The pressure plate is inserted in the pack case from the access opening, and presses the rear face of the film unit which is the lowest in the pack case.

According to the invention, as the pressing member is rotatable, it is provided in a small space for the film pressing device, which makes the image recording apparatus slimmer. Further, as the first torsion spring and the second torsion spring are used, the pressure is adjusted corresponding to the number of the film units in the pack case. Therefore, the film units are neither broken nor ruptured, even if the number is under a predetermined one.

BRIEF DISCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
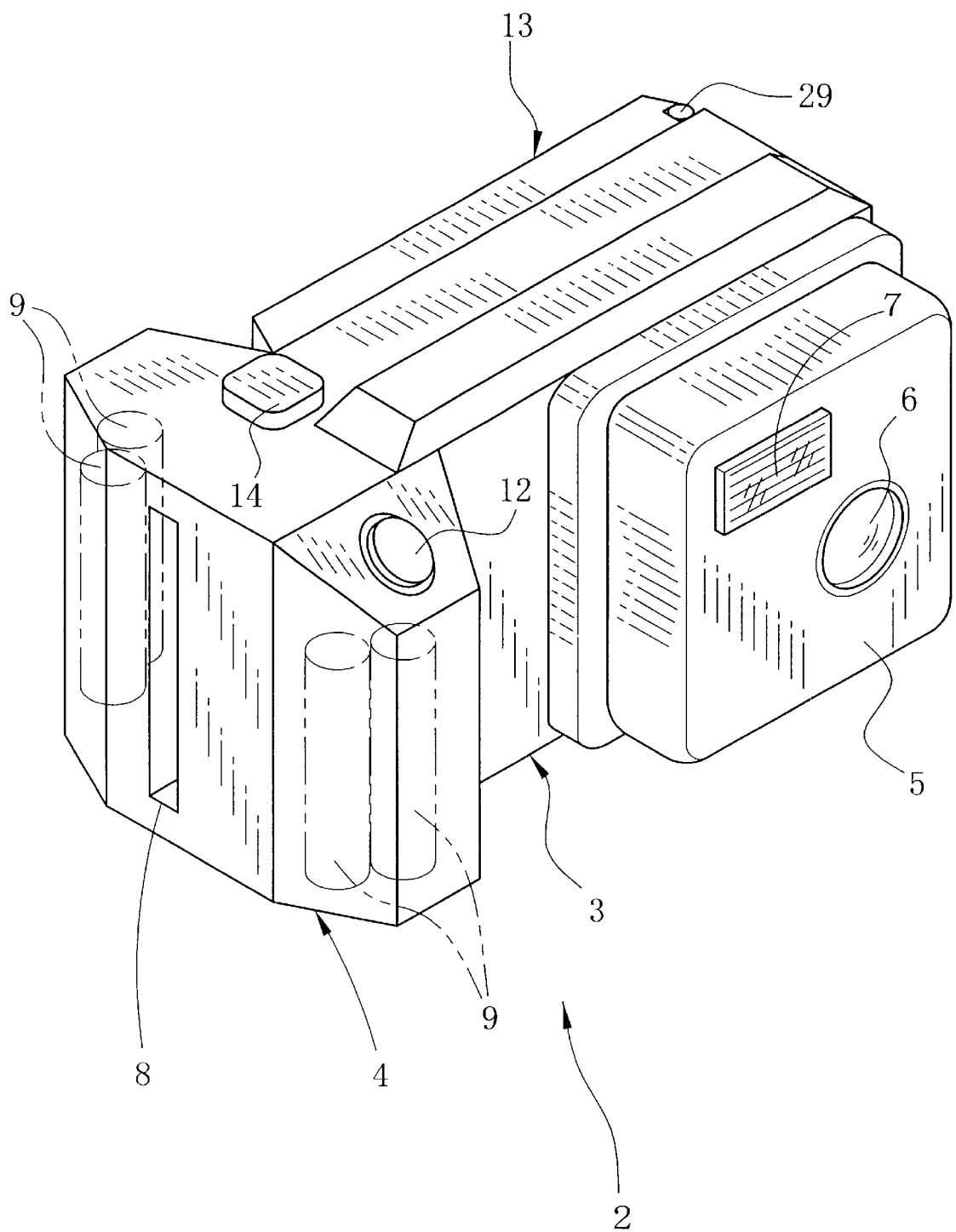
FIG. 1 is a perspective front view of a printer built-in electric still camera.

In FIG. 1, a printer built-in electric still camera 2 (hereinafter simply called a camera printer) has a camera body 3 of a nearly rectangular-shaped form. In the right side of the camera body 3, a grip 4 is formed, and a lens barrel or housing 5 is protruded from the camera body 3.

A front face of the lens barrel 5 is provided with a taking lens 6 and a flash light projector 7. Behind the taking lens 6, as well known, an iris diaphragm, a shutter mechanism, and a CCD image sensor are arranged in this order. On the CCD image sensor, an image of objects is formed through the taking lens 6 when the shutter mechanism is open. The flash light projector 7 has a photo sensor therein for detecting a reflected flashlight from the objects. If the integrated value of amount of reflected flashlight reaches a predetermined value, the flash light projector 7 stops emitting the flashlight.

The grip 4 has a film ejection slot 8 on a side face and two battery rooms 11 (see FIG. 4) in its front side and rear side respectively, which can contain two pairs of dry batteries 9 illustrated with phantom lines. On the upper face of the front side of the grip 4, a release button 12 is disposed so that photographer may easily push it with his forefinger of his right hand holding the grip 4. Further, the camera body 3 is provided with a pack chamber door 13 and an unlock button 14.

Figure 2:
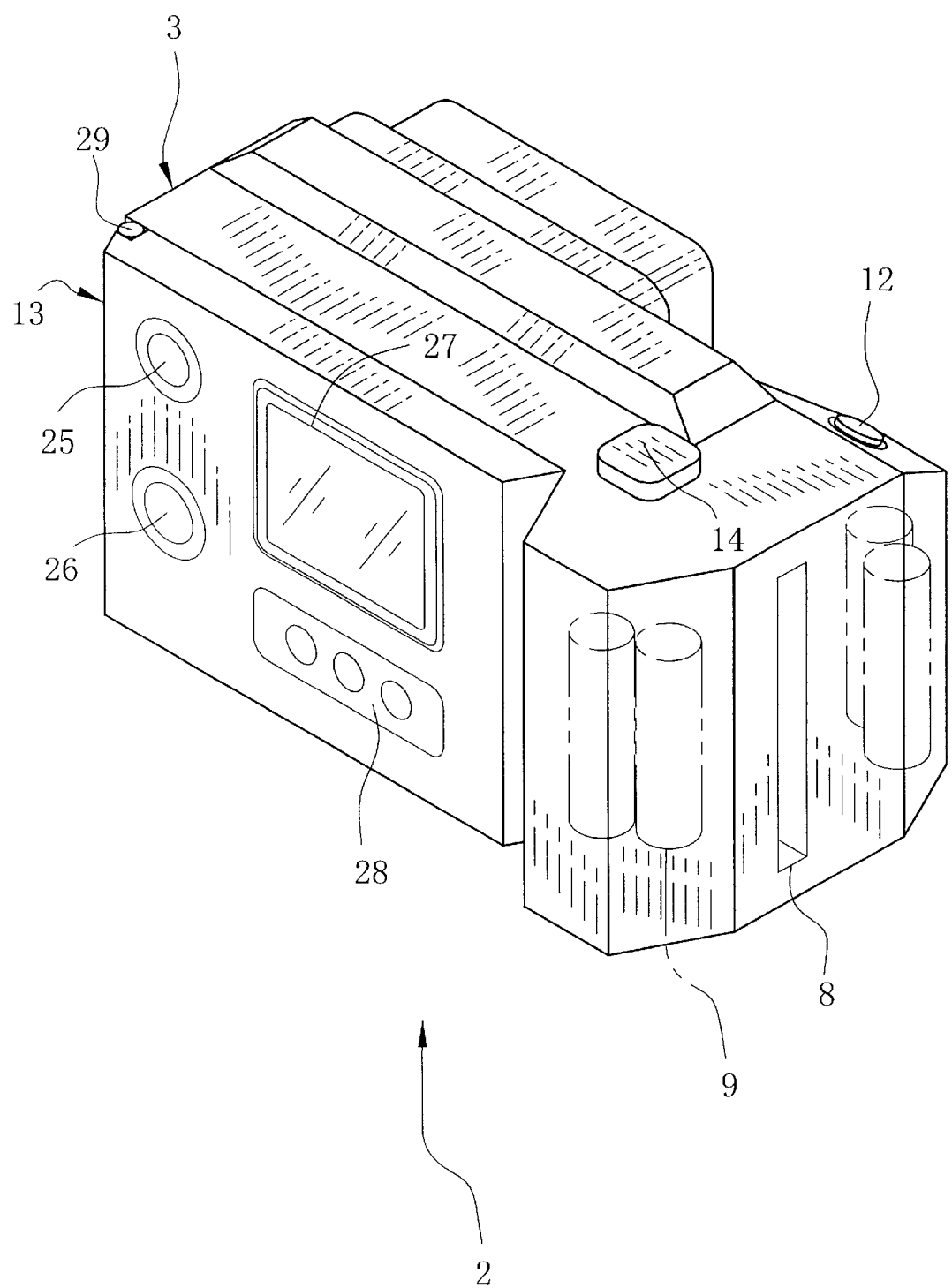
FIG. 2 is a perspective rear view of the printer built-in electric still camera.

As shown in FIG. 2, the pack chamber door 13 has a power switch 25, a print start button 26, a liquid crystal display panel (LCD panel) 27 and an operation panel 28 and the like. The LCD panel 27 works as an electronic viewfinder that displays objects in a real time. The operation panel 28 is provided with a taking/replay mode selection key, a frame selection key, and an image data clear key, an image data output/input selection key and the like.

When the release button 12 is pushed, an image of the objects focused on the CCD image sensor is picked up, and the image is converted into image data. The image data is transformed into a format for inside processing and stored in a memory mounted in the camera printer 2. The image memory may also be a card memory which is easily inserted in and withdrawn from the camera printer 2 through a card slot (not-shown).

Figure 3:
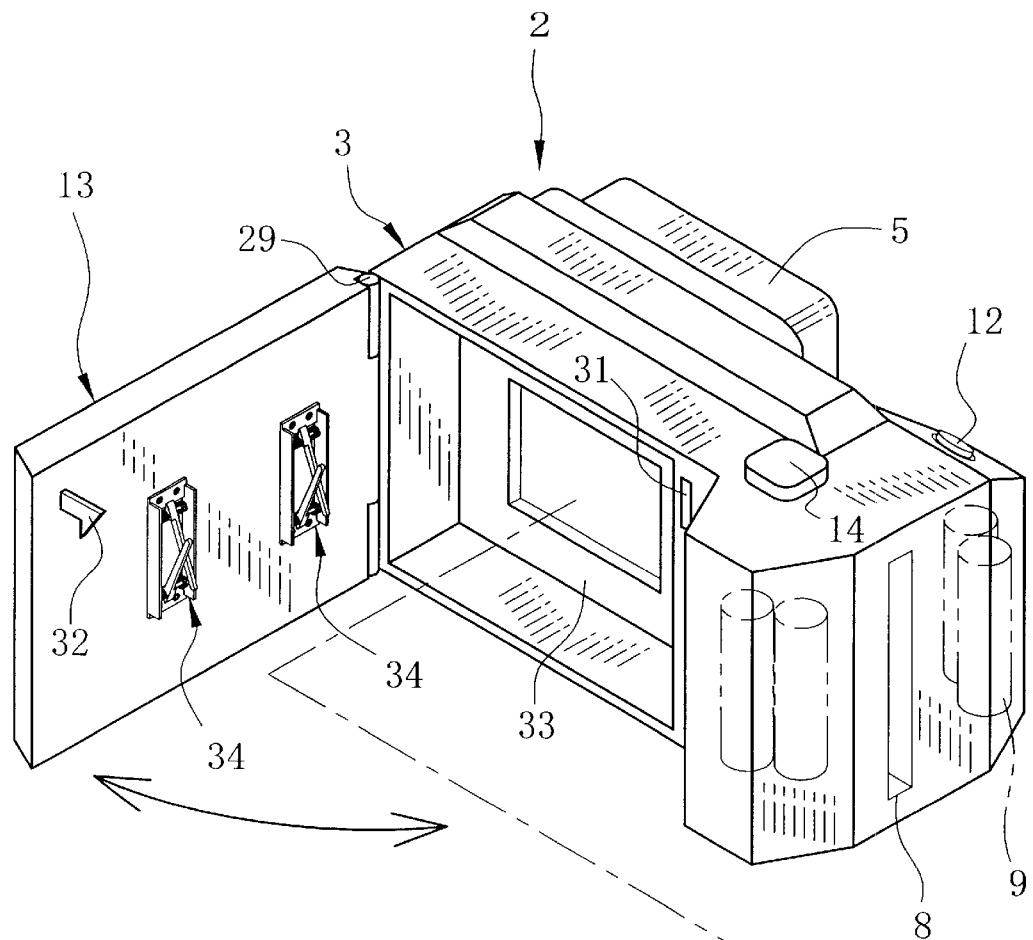
FIG. 3 is a perspective rear view of the printer built-in electric still camera whose pack chamber door is open.
Figure 3:
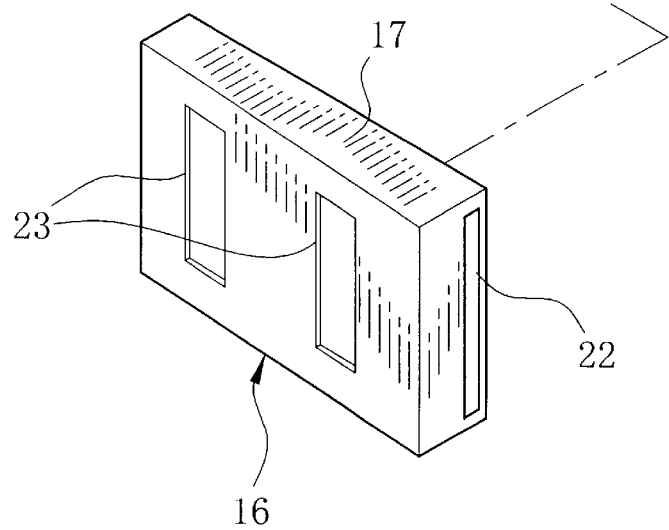

The pack chamber door 13 is rotatably attached to a camera body 3 at a side by a hinge 29. As shown in FIG. 3, the pack chamber door 13 has a claw 32 in another side on its inner face, which engages in a locking mechanism 31. A pack chamber 33 is formed at the rear side of the camera body 3 for containing a film pack 16. When the film pack 16 is loaded in the pack chamber 33, an unlock button 14 is pushed. The locking mechanism 31 makes claw 32 release, and the pack chamber door 13 can swing around the hinge 29 to open.

On the middle area of the inner face of the pack chamber door 13, film pressing devices 34 are attached. Their positions corresponds with the access opening 23 of the film pack 16. When the pack chamber door 13 is closed, the film pressing devices 34 enter in the film pack 16 through the access openings 23.

Figure 4:
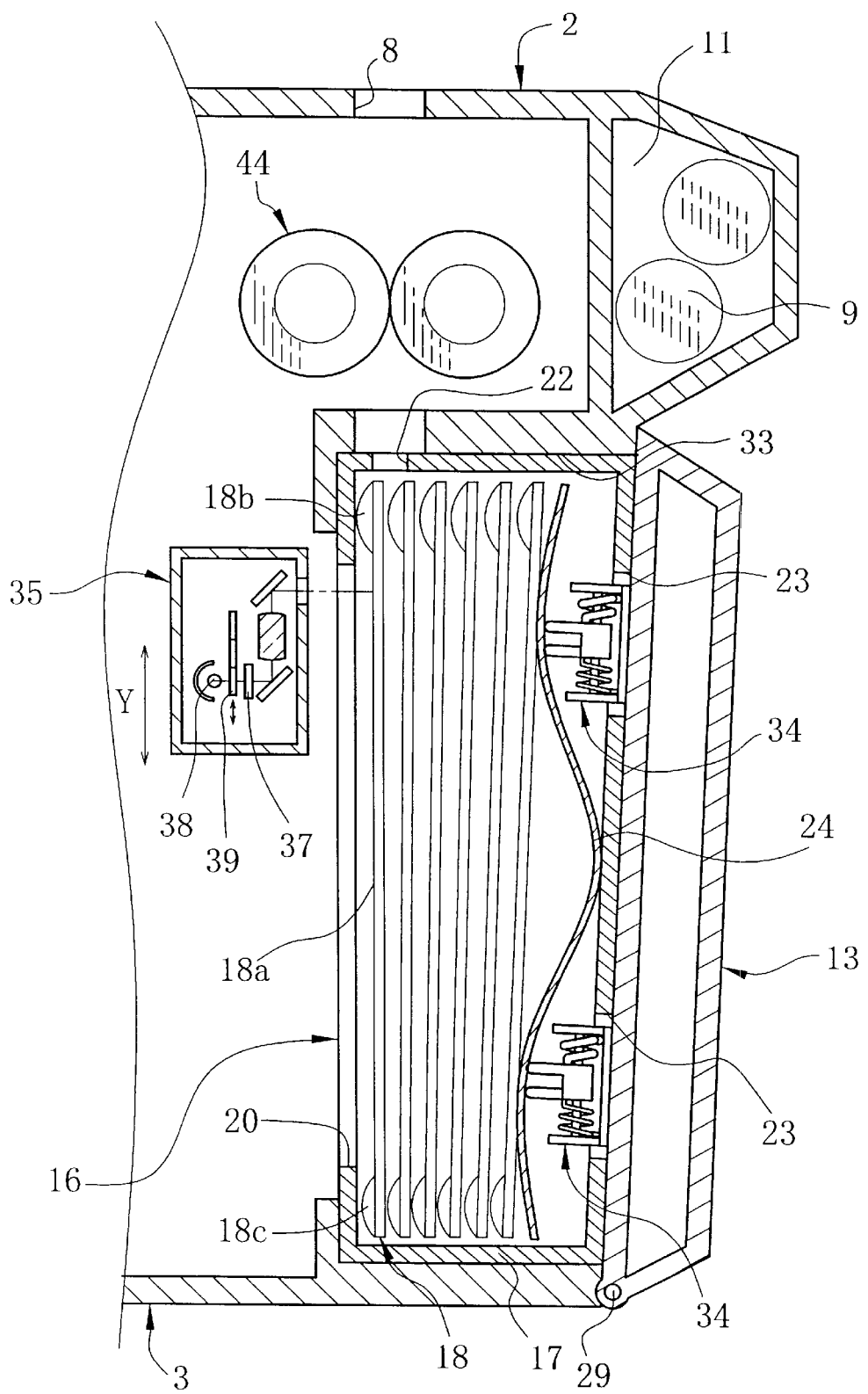
FIG. 4 is a sectional view of the printer built-in electric still camera in which a film pack is loaded.

As shown in FIG. 4, the film pack 16 includes a box-shaped pack case 17 and at most ten film units 18 contained therein. The film unit 18 consists of an exposure surface 18a, a pod 18b containing developing solutions, and a trap portion 18c for absorbing excess solutions remaining upon being spread. In fact, the film unit 18 has a photosensitive sheet, an image receiving sheet and a transparent cover sheet. However, details of the sheets will not be explained as they have no relation with the present invention. The pack case 17 has an exposure opening 20 on its upper or front wall for determining an exposure area on the film unit 18, and a pair of the access openings 23 on its bottom wall. While the film pack 16 is not loaded in the pack chamber 33, the exposure opening 20 is covered with a light-shielding cover (not shown), and the film units 18 are never exposed. The light-shielding cover and the exposed film unit 18 are ejected from an outlet mouth 22 formed upward on a side face of the pack case 17.

One edge of a light-shielding sheet 24 is secured to an inner face of the pack case 17. The light-shielding sheet 24 has a little smaller size than the film unit 18 and covers the access opening 23 from the inside of the pack chamber. The access openings 23 have a rectangular-shaped form whose longitudinal direction is perpendicular to an ejecting direction of the film unit 18. They are arranged parallel in the ejecting direction apart from each other. The whole of the film pressing device 34 is inserted in the pack case 17 through the access opening 23, and the film unit 18 is pressed on the exposure opening 20 through the light-shielding sheet 24. Then, the top of the film unit 18 becomes flat on the exposure opening 20 and a sharp image can be printed on the film unit 18.

Before the pack chamber 33, there are a printer section constituted of a print head 35, and a scanning mechanism 36 (see FIG. 6) for moving the print head 35 over the film unit 18.

The print head 35 closely faces to the exposure opening 20 and projects the printing light beams on the exposure surface 18a of the film unit 18. The print head 35 has a head housing containing a fluorescent lamp 38, an LCD array 37 of a transparent type, and a color filter 39 slidably disposed between the LCD array 37 and the fluorescent lamp 38. The LCD array 37 has a large number of dot segments (micro shutter) aligned in a main scanning direction perpendicular to the ejecting direction. The fluorescent lamp 38 illuminates a white illumination light on each of the dot segments. The color filter 39 consists of a red filter portion, a green filter portion and a blue filter portion. The color filter 39 is slid to change the filter portion when the print head 35 performs one scanning in the sub scanning direction. The illumination light passes through one of the three color filter portions while the print head 35 scans over the exposure surface 18a in the sub scanning direction. The colored illumination light passes through the LCD array 37 and directs onto the film unit 18. When the print head scans three times, the exposure surface 18a is exposed to red, green and blue illumination lights one by one to complete a full-color exposure.

Figure 5:
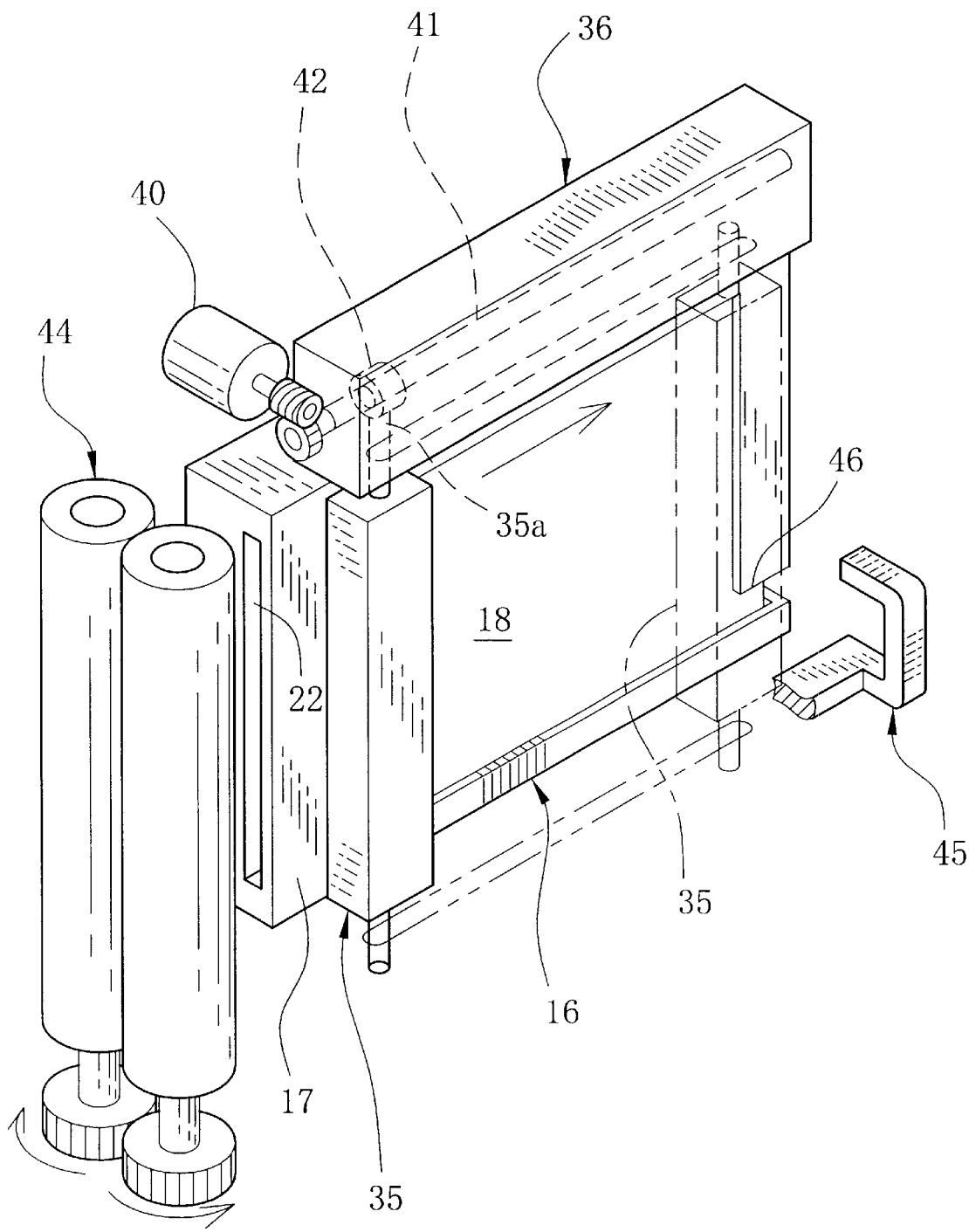
FIG. 5 is a schematic view illustrating a printer head and its moving mechanism.

The scanning mechanism 36 moves the print head 35 in the sub scanning direction with a certain velocity. As shown in FIG. 5, the scanning mechanism 36 includes a scanning motor 40, a lead screw 41 driven by the scanning motor 40, a nut member 42 which moves at a certain velocity on the lead screw 41 in accordance with rotation of the scanning motor 40. The axle 35a of the print head 35 is rotatably and rigidly secured to the nut member 42.

The scanning motor 40 is a bi-directional stepping motor that causes the print head 35 to move from a first terminal shown by solid lines to a second terminal shown by phantom lines in response to forward rotation of the scanning motor 40. While the print head 35 moves in the sub scanning direction from the first to the second terminal (or from the second to the first terminal), the exposure surface 18a of the film unit 18 is exposed line by line with single color light.

A film ejecting mechanism is constituted of a pair of film processing rollers 44, a claw member 45 and the like. The claw member 45 enters in the film pack 16 from a cut-off 46 formed at the end of the exposure opening 20 and pushes the film unit 21 out of the film pack 16. The pair of the film processing rollers 44 rotates after three color exposures and nips the film unit 18. While the film unit 18 is squeezed through the film processing rollers 44, the pod 18b is ruptured, and the processing solution is spread over the film unit 18. Then, after development, the film unit 18 is fed out through the ejection slit 8.

It is to be noted that the film processing roller 44 and the claw member 45 are the same as those of the prior art, such as described in Japanese Patent laid-open number 4-194832.

Figure 6:
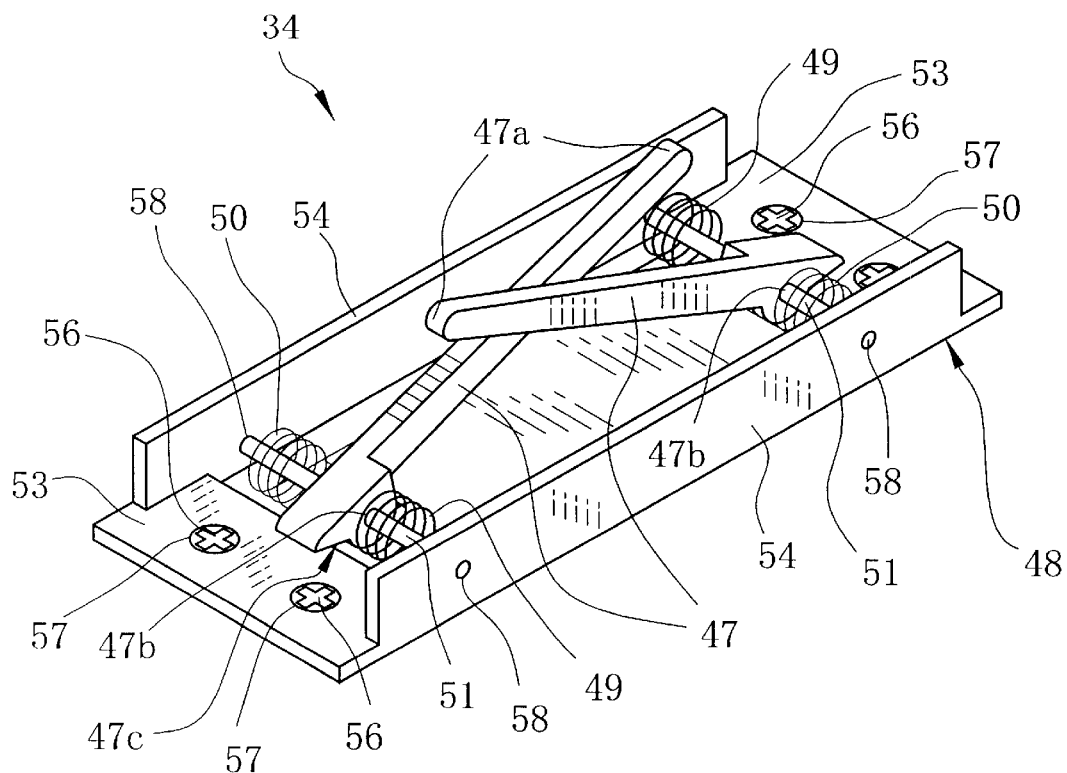
FIG. 6 is a perspective view of a film pressing device of the first embodiment of the present invention.
Figure 7:
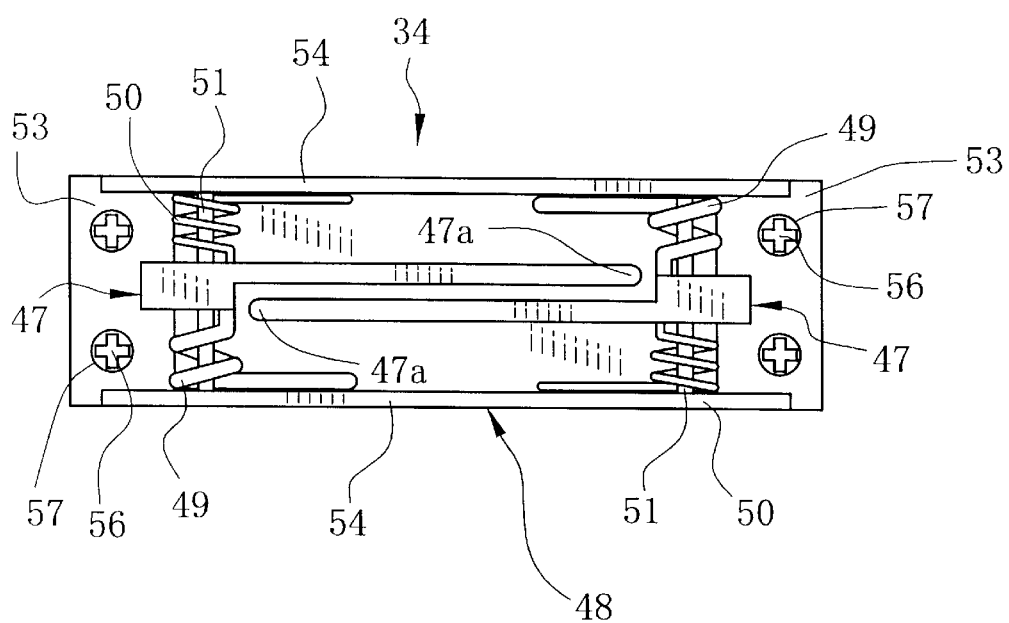
FIG. 7 is a top plan view of the film pressing device illustrated in FIG. 6.

As shown in FIGS. 6 and 7, the film pressing device 34 includes a pair of lever members 47 formed by bending metallic fragments to have a stick-like shape, a frame 48 holding the lever members rotatably and secured on the inner face of the pack chamber door 13, a strong spring 49 and a weak spring 50.

The lever member 47 has a contact portion 47a at its end for contacting to the light-shielding sheet 24 and presses the film unit 18 to the exposure opening 20. The contact portion 47a has a smooth and curved surface in order not to damage the film unit 18. At another end, the lever member 47 has a hole 47b in which a shaft 51 loosely fits.

The frame 48 is formed in a channel-shaped form by bending a metal plate so as to fit in the access opening 23. The frame 48 is constituted of a pair of bottom plates 53 and side plates 54 being perpendicular to the bottom plates 53. The side plate 54 has two holes 58 in which the shafts 51 are fitted and fixed with the adhesive agent. The shaft 51 rotatably secures the lever member 47. The bottom plate 53, having plural screw holes 57, is fixed on the pack chamber door 13 by screws 56. It is noted that the bottom plate 53 is fixed on the pack chamber door 13 not only with the screws 56, but may also be with spot welding if the inner face of the pack chamber door 13 is made of metal.

Figure 8A:
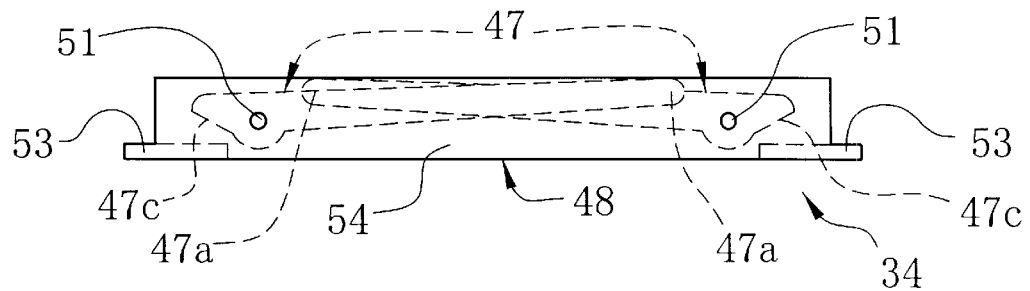
FIGS. 8A and 8B are explanatory views illustrating a first rotational position and a second rotational position of the film pressing device respectively.
Figure 8B:
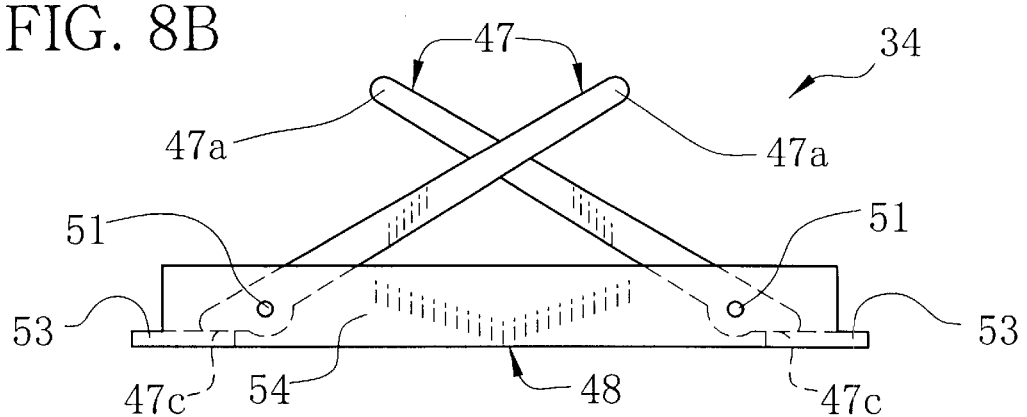

In this embodiment, the coupled lever members 47 are positioned parallel and reversely so as to reverse positions of contact portion 47a and hole 47b with each other. Further, the lever member 47 is rotatable between a first rotational position illustrated in FIG. 8A and a second rotational position illustrated in FIG. 8B. In the first rotational position, the lever member 54 is pressed down below an upper edge of the side plate 54 and positioned almost parallel to the side plate 54. In the second rotational position, which is a limit of rotation, the lever member 47 doesn't contact any film unit 18 because the pack case 17 is empty, and it stops the lever member 47 rotating much more while a contact surface 47c contacts to the bottom plate 53. It is noted that the strong spring 49 and the weak spring 50 are not illustrated in FIGS. 8A and 8B for simplicity.

The strong spring 49 and the weak spring 50 are torsion coil springs that bias the lever member 47 to rotate. An end of the strong spring 49 is connected to the frame 48 and another end contacts to the bottom face of the lever member 47. An end of the weak spring is connected to the frame 48 and another end connects to the lever member 47.

There is a difference of bias angular ranges between the strong spring 49 and the weak spring 50. The strong spring 49 biases the lever member 47 with a large bias force, and its bias angular range is narrow. The weak spring 50 biases the lever member 47 with a weak bias force, and its bias angular range is wide. Therefore, in the first rotational position, the lever member 47 is biased by both the strong spring 49 and the weak spring 50 with the largest biasing force. While the film units 18 are ejected from the film pack 16 one by one, the lever member 47 rotates to the second rotational position. When the lever member 47 is in a third rotational position (not shown), the bias angular range of the strong spring is maximal. Thereafter, the lever member 47 doesn't contact the strong spring 49 and is biased only by the weak spring 50 to rotate to the second rotational position.

An effect of the above-described structure will be explained. The pack chamber door 13 is opened in order to load the film pack 16 in the camera printer 2. As the pack chamber door 13 is open as shown in FIG. 3, the lever member 47 doesn't contact to the film unit 18 yet and is biased by the weak spring 50 to be in the second rotational position.

The pack chamber door 13 is closed, after the fresh film pack 16 is loaded in the pack chamber 33. As shown in FIG. 4, the film pressing device 34 enters in the pack case 17 through the access opening 23 to press the light-shielding sheet 24 and thus the film unit 18 onto the exposure opening 20. As there are the ten film units 18 in the film pack 16, the lever member 47 is pressed from the second rotational position to the first rotational position against the biasing force of the weak spring 50. During rotation, the lever member 47 contacts the strong spring 49, and thereinafter is pushed down and retracted in the frame 48. The frame 48 is formed so as to fit in the access opening 23, and the whole of the frame 48 enters in the film pack 16. Accordingly, it is not necessary to keep a space between the pack chamber door 13 and the film pack 16 and thus the camera printer 2 becomes slimmer. Further, as the lever member 47 is urged by the strong spring 49 and the weak spring 50, even the ten film units 18 are pressed on the exposure opening 20 with such a strength of pressure that the exposure surface 18a may be flat on the exposure opening 20.

When the release button 12 is pressed down after loading of the film pack 16, the film ejecting mechanism drives and the light-shielding cover is pulled out of the film pack 16 and ejected through the film processing roller 44 from the film ejection slot 8. As the light-shielding cover is ejected, the lever member 47 rotates to press and shift a stack of the film units 18 forward. Thus, the top one of them faces the exposure opening 20 and the taking can be made. image sensor. The CCD image sensor picks up the image and outputs its electric signals. A/D transformation and image processing (γ correction, color correction) of them are made, and then they are stored in the image memory.

After pick-up, a taken image is displayed on the LCD panel 27. If a hard copy is necessary, the print start button 26 is operated. The print head 35 moves in the sub scanning direction Y by the scanning mechanism 36. While the print head 35 moves, the LCD array 37 is actuated in accordance with the image data read from the image memory, thus one of the three colors is printed on the exposure surface 18a of the film unit 18 by each line. When the print head 35 moves three times along the sub scanning direction, a full-color image is recorded latently on the exposure surface 18a.

The film ejecting mechanism drives and the exposed film unit 18 is pressed out from the pack case 17 and fed to the film processing roller 44. It ruptures the pod 18b and extends the developing solution on the whole of the film unit 18. The film unit 18, after passing through the processing roller 44, is ejected from the film ejection slot 8.

The exposed film units 18 are ejected one by one, and the thickness of the remained film units becomes thinner. The lever member 47 rotates and pushes the film units 18 onto the exposure opening 20. When the number of the film units 18 in the pack case 17 is less than a predetermined one, for example 5, the bias angle of the strong spring 49 reaches to the maximum and it can't press the lever member 47 any more. Although only the weak spring 50 biases the lever member 47, the small number of film units 18 is pressed so as not to move on the exposure opening 20. When the film pack 16 contains no film unit 18, the lever member 47 is in the second rotational position. Rotation of the lever member 47 is stopped as the contact face 47c contacts to the bottom plate 53.

As two types of the torsion springs, the strong spring 49 and the weak spring 50, are used, the film units 18 are always pressed with adequate pressure by the lever member 47. If the number of them is under the predetermined one, only the weak spring 50 urges the lever member 47 to press them under the predetermined number. Therefore, a large pressure will not damage the film units 18.

Figure 9:
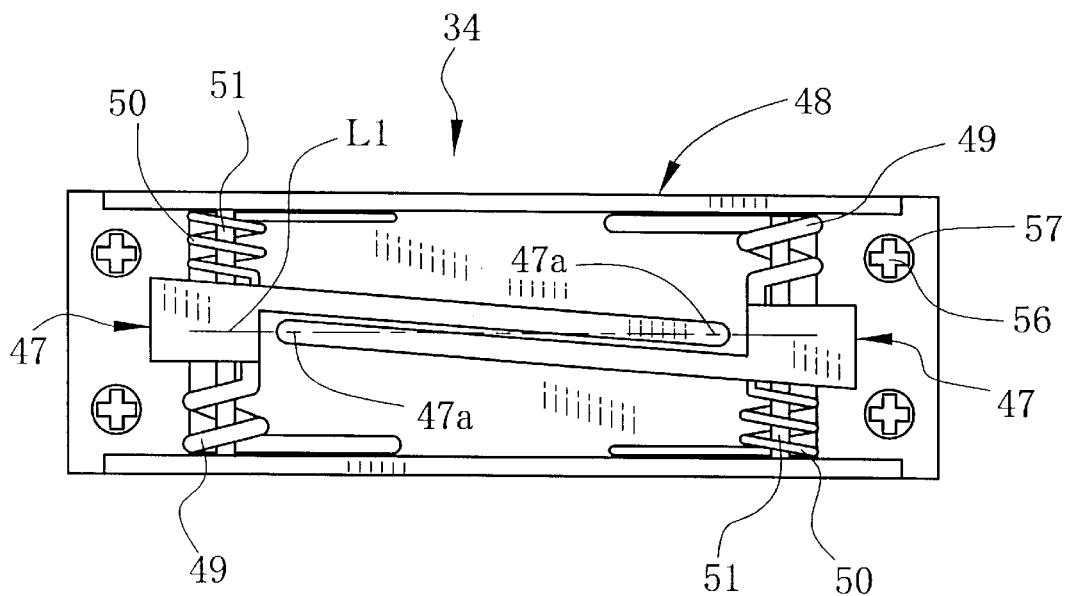
FIG. 9 is a plan view of a film pressing device of a second embodiment of the present invention.
Figure 10:
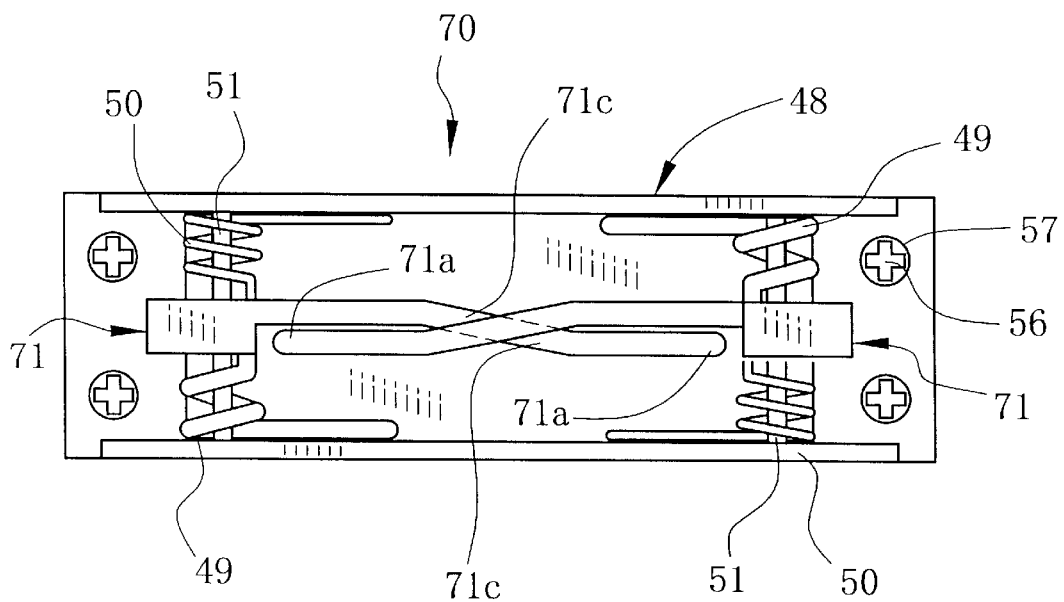
FIG. 10 is a plan view of a film pressing device of a third embodiment of the present invention.

The film pressing device 34 can press the film units 18 on the exposure opening 20 more effectively if lines L1 connecting the contact portions 47a of the coupled lever members 47 are parallel to the widthwise direction of the film unit 18 (the main scanning direction). For example, as shown in FIG. 9, the coupled lever members 47 are parallel but slightly inclined related to a direction perpendicular to a shaft 51. Further, as shown in FIG. 10, the lever members 71 maybe bent in their middle portions 71c in order that they don't interface each other in rotation. The number 71a designates a pressing portion, and the same members are assigned the same numbers between FIGS. 7 and 8.

Figure 11:
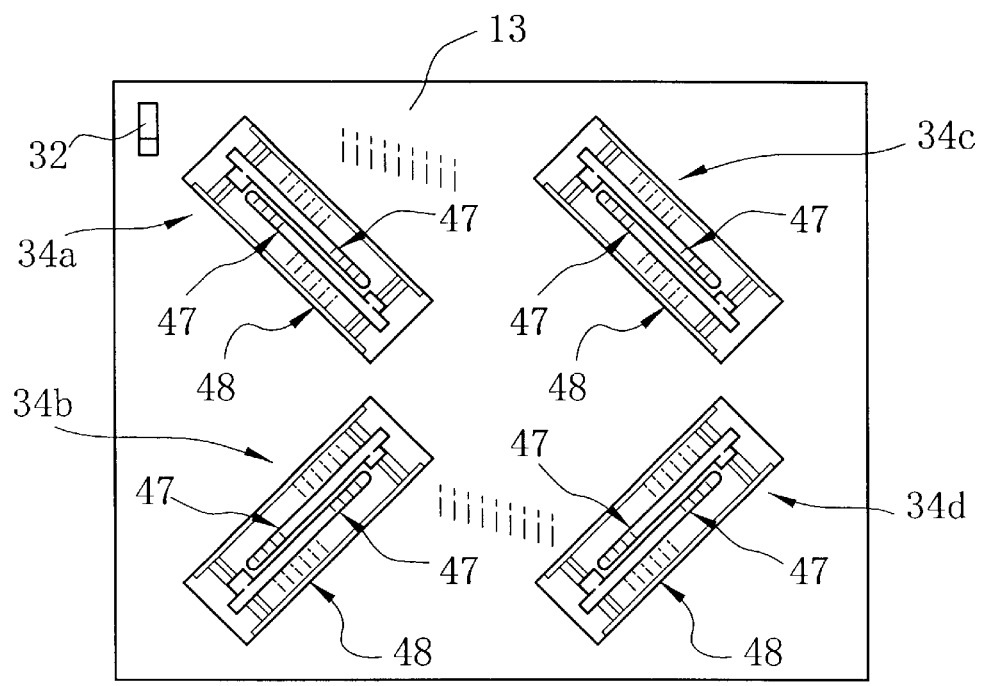
FIG. 11 is a front view of a pack chamber door illustrating arrangement of film pressing devices.

In all of the above-described embodiments, the two film pressing devices 34 are attached on the inner face of the pack chamber door 13. However, as shown in FIG. 11, the four film pressing devices 34a, 34b, 34c and 34d may be attached on the pack chamber door 13 with inclination to an angle of predetermined degrees to the widthwise direction of the film unit 18. Further, the coupled film pressing devices 34a and 34b or 34c and 34d are symmetrically disposed in the widthwise direction (sub scanning direction Y) of the film unit 18 and the film pressing devices 34a and 34c or 34b and 34d are parallel. In these embodiments, the pressure is almost the same everywhere on the exposure surface 18a, which makes it flatter on the exposure opening 20.

Figure 13A:
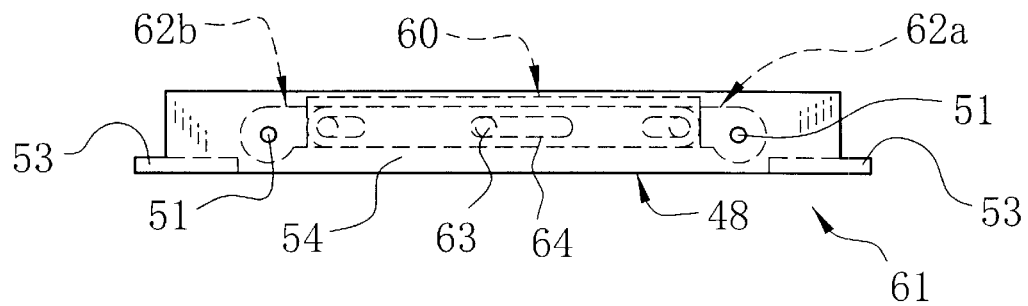
FIGS. 13A and 13B are explanatory views of a film pressing device of the fifth embodiment of the present invention in the first rotational position and second rotational position respectively.
Figure 13B:
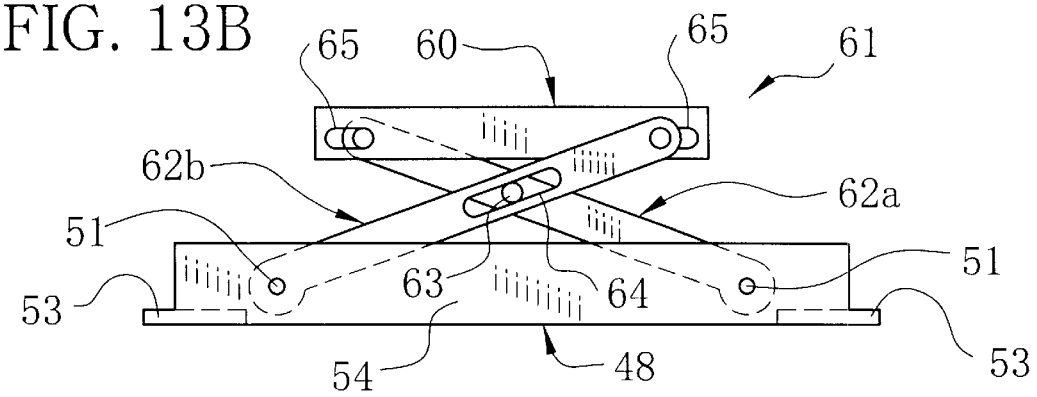
Figure 12:
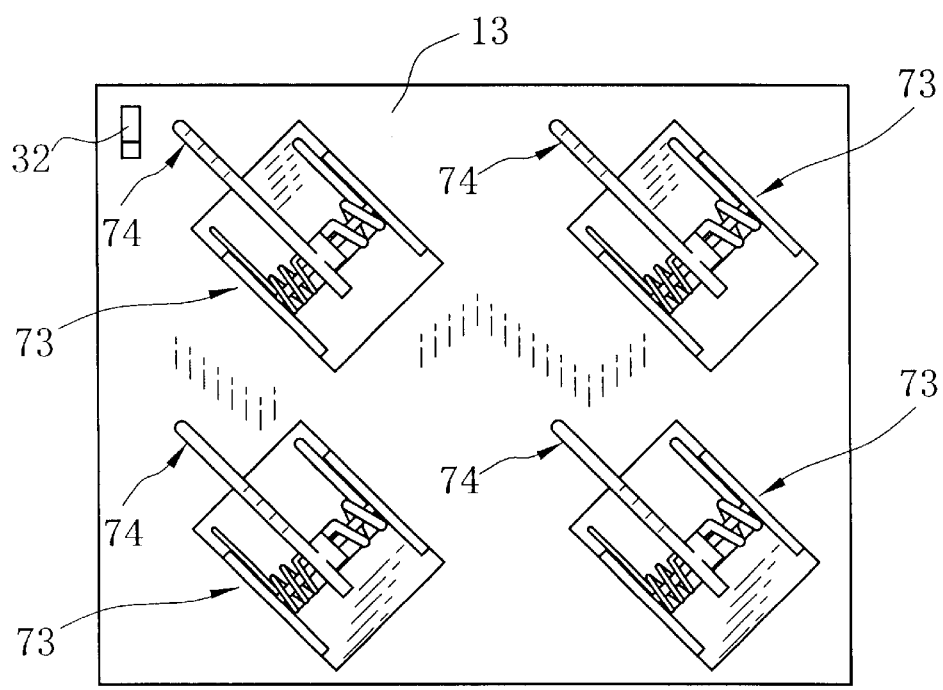
FIG. 12 is a front view of a pack chamber door illustrating arrangement of film pressing devices in the forth embodiment.

In FIG. 12, the film pressing device 73 has only a lever member 74. The four film pressing devices 73 are attached around a center of the pack chamber door 13, oriented in the same direction with inclination to an angle of some degrees to the widthwise direction of the film unit 18. Also in the embodiment, two film pressing devices are attached along the widthwise direction of the film unit 18 so that a line connecting the contact portions 47a may be parallel to the widthwise direction of the film unit 18 (sub scanning direction). Further, the pack case 17 may have four access openings As shown in FIGS. 13A and 13B, a film pressing device 61 may have a pressure plate 60, lever members 62a and 62b, the frame 48, and strong and weak springs which are not shown for simplicity of the figures. The lever members 62a and 62b are slidably connected to both lateral sides of the pressure plate 60 and urged by the strong spring and the weak spring disposed around the shafts 51. Therefore, the lever members 62a and 62b can rotate around the shafts 51 held by the frame 48. Note that the same numbers are applied to the members or portions illustrated also in FIGS. 8A and 8B, and explanations for them are unnecessary.

The lever members 62a and 62b have a pin 63 and a hole 64 respectively and are crossed and connected by slidably fitting the pin 63 in the hole 64. The pressure plate 60 is a long plate having a flat face for contacting on the light-shielding sheet 24. In both ends, it has long holes 65 in which pins formed on the lever members 62a, 62b slidably fit. The pressure plate 60 can perform parallel motion between the first rotational position illustrated in FIG. 13A and the second rotational position illustrated in FIG. 13B. As the pressure plate 60 presses the wider size of the film unit 18 in this embodiment than in the former ones, the exposure surface 18a on the exposure opening 20 may become more flat.

The present invention is not restricted in the embodiments above described. Therefore, the film pressing device of the present invention is not only applied to the camera printer but also to a instant printer or a instant camera with a taking lens.

Further, various changes and modifications are possible in the present invention and may be understood to be within scope of the present invention.

What is claimed is:

1. A film pressing device for an image recording apparatus, said image recording apparatus including a pack chamber in which an instant film pack is loaded, and a lid for opening and closing the pack chamber, said instant film pack including a box-shaped pack case and instant film units contained therein, said case having an exposure opening on a front wall thereof for exposure of said instant film unit, and at least one access opening on a back wall thereof, said film pressing device comprising:

a holder fixed on an inner face of said lid;

at least one pressing member attached to said holder, so as to rotate between a first rotational position and a second rotational position;

a pressing portion formed on said pressing member, said pressing portion inserted in said pack case through the access opening when said lid is closed, and pressing a rear face of the lowest one of said instant film units such that the top one of said instant film units may contact on an inner side of said front wall; and a biasing member for biasing said pressing member to rotate from a first rotational position to a second rotational position.

2. A film pressing device as claimed in claim 1, wherein said biasing member comprises;

a first torsion spring whose spring force is weak, for biasing said pressing member from said first rotational position to said second rotational position; and a second torsion spring whose spring force is strong, for biasing said pressing member from said first rotational position to a third rotational position, said third rotational position being between said rotational position and said second rotational position.

3. A film pressing device as claimed in claim 2, wherein said holder is inserted in said pack case through said access opening while said lid is closed.

4. A film pressing device as claimed in claim 3, wherein said pressing member is in said third rotational position when a number of said instant film units contained in said pack case is N/2, and wherein N is the maximum number of said instant film units which said pack case can contain.

5. A film pressing device is claimed in claim 3, wherein said pressing member is a pressure lever having an first end and a second end, said first end being said pressing portion, and said second end being rotatably attached to said holder.

6. A film pressing device as claimed in claim 5, wherein said holder has a bottom portion and a pair of side portions to have a channel-shaped form, said bottom portion being fixedly mounted on said inner face of said lid, the pair of said side portions holding a shaft stationarily, and said second end being rotatably fitted on said shaft.

7. A film pressing device claimed in claim 6, wherein said first and second springs are fitted on said shaft so as to sandwich said second end of said pressure lever.

8. A film pressing device as claimed in claim 3, wherein said at least one pressing member are first and second pressure levers, each of said pressure levers having first ends and second ends, each of said first ends being said pressing portions;

said holder has a channel-shaped form with a bottom portion and a pair of side portions, said bottom portion being fixed on an inner f ace of said lid, the pair of said side portions stationary holding first and second shafts with a suitable distance, said first shaft rotatably holding said second end of said first pressure lever, and said second shaft rotatably holding said second end of said second pressure lever; and said first and second pressure levers cross while rotating to said second rotational position.

9. A film pressing device as claimed in claim 8, wherein said first and second pressure levers are parallel to the pair of said side portions.

10. A film pressing device as claimed in claim 9, wherein said side portions are parallel to a widthwise direction of said instant film unit.

11. A film pressing device as claimed in claim 8, wherein a line connecting said pressing portions of said first pressure lever and said second pressure lever is parallel to a widthwise direction of said instant film unit.

12. A film pressing device as claimed in claim 11, wherein aid first and second pressure levers are inclined to said side portions.

13. A film pressing device as claimed in claim 11, wherein said first lever is disposed over and crossed with said second lever.

14. A film pressing device for an image recording apparatus, said image recording apparatus including a pack chamber in which an instant film pack is loaded, and a lid for opening and closing the pack chamber, said instant film pack including a box-shaped pack case and instant film units contained therein, said case having an exposed opening on a front wall thereof for exposure of said instant film unit, and at least one access opening on a back wall thereof, said film pressing device comprising:

a holder fixed on an inner face of said lid;

first and second pressure levers rotatable between a first rotational position and a second rotational position, each of said first and second pressure levers having first ends and second ends, said first ends rotatably attached to said holder;

a pin formed in the middle of said first pressure lever;

a long hole formed in the middle of said second pressure lever, said long hole slidably fitted on said pin;

a pressure plate connected to said second ends of said first and second levers, said pressure plate inserted in said pack case through said access opening, said pressure plate pressing a rear face of the lowest one of said instant film units to contact the top one of said instant film units on an inner face of said front wall; and first and second biasing members for biasing said first and second pressure levers from said first rotational position to said second rotational position respectively.

15. A film pressing device as claimed in claim 14, wherein said first biasing member includes first and second torsion springs, and said second biasing member includes third and forth torsion springs;

said first and third torsion springs urge said first and second pressure levers from said first rotational position to said second rotational position; and said second and forth torsion springs urge said first and second pressure levers from said first rotational position to a third rotational position, and said third rotational position being between said first rotational position and said second rotational position.

16. A film pressing device as claimed in claim 15, wherein said holder is inserted in said pack case through said access opening while said lid is closed.

17. A film pressing device as claimed in claim 16, wherein said holder has a channel-shaped form, constituted of a bottom portion and a pair of side portions, said bottom portion being fixedly mounted on said inner face of said lid, the pair of said side portions holding first and second shafts stationarily, and said first and second shafts rotatably holding said first and second pressure levers respectively.

18. A film pressing device claimed in claim 17, wherein said first and second torsion springs are fitted on said first shaft so as to sandwich said second end of said first pressure lever, and said third and forth torsion springs are fitted on said second shaft so as to sandwich said second end of said second pressure lever.

* * * * *